No. 883,908. PATENTED APR. 7, 1908.
S. G. PETTERSON.
COMBINED BEVEL AND SQUARE.
APPLICATION FILED JUNE 24, 1907.
2 SHEETS—SHEET 1.
Fig.1.
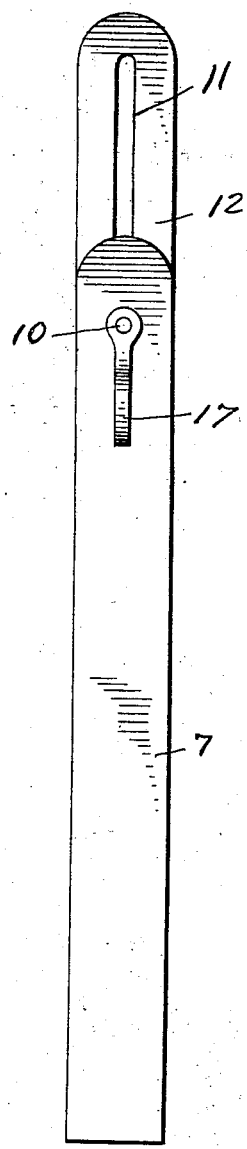
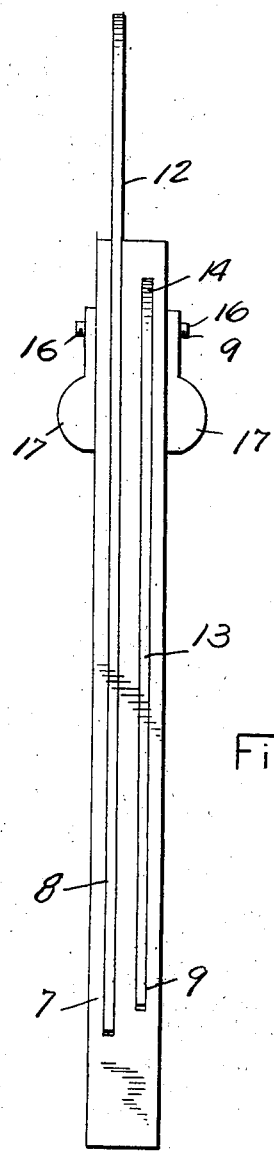
Fig.2.
Witnesses
C. R. Thomas
F. G. Smith
Inventor
Simon G. Petterson
By Chandler & Chandler
Attorneys
THE NORRIS PETERS CO., WASHINGTON, D. C.

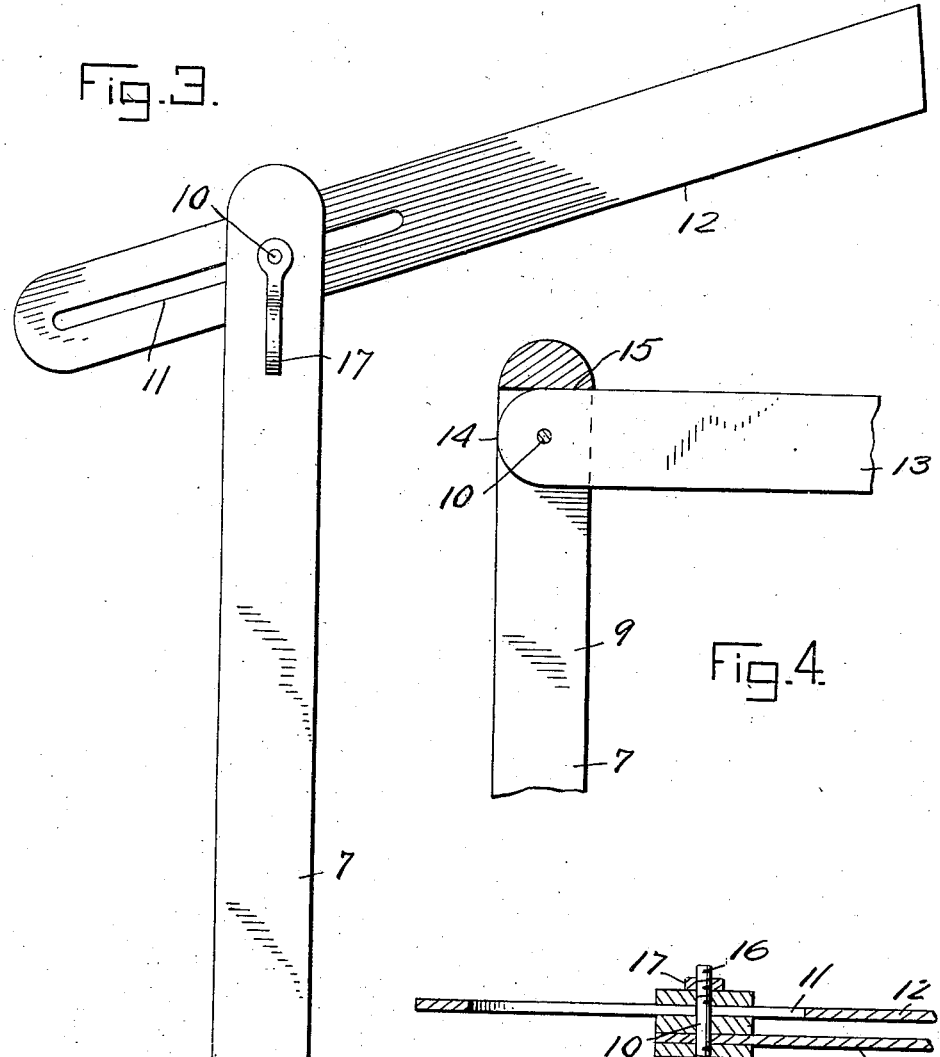

UNITED STATES PATENT OFFICE.

SIMON G. PETTERSON, OF PINE BLUFF, ARKANSAS.

COMBINED BEVEL AND SQUARE.

No. 883,908.   Specification of Letters Patent.   Patented April 7, 1908.

Application filed June 24, 1907. Serial No. 380,538.

*To all whom it may concern:*

Be it known that I, SIMON G. PETTERSON, a citizen of the United States, residing at Pine Bluff, in the county of Jefferson, State of Arkansas, have invented certain new and useful Improvements in Combined Bevels and Squares; and I do hereby declare the following to be a full, clear, and exact description of the invention, such as will enable others skilled in the art to which it appertains to make and use the same.

This invention relates to combined bevels and squares and has for its object to provide a tool of this class which is foldable so that it may be readily carried in one's pocket and when unfolded will effectually perform all the functions of either a square or bevel.

In carrying out my invention I provide a tool comprising a handle portion which is provided with two slots one of the slots opening through the sides and one end of the handle portion and the other slot opening only through the sides. A bevel blade is pivoted in the first mentioned slot and may be swung from without the said slot to assume the proper relative position with respect to the handle and a tri-square blade is pivoted in the last mentioned slot and may be swung therefrom to a position at right angles with respect to the tool handle, it being prevented from movement beyond this position by the abutment of one of its edges with one end wall of the slot in which it is pivoted. One advantage apparent in the square construction of the tool is that the square blade may be swung to extend upon either side of the tool.

In the accompanying drawings, Figure 1 is a view in elevation of the tool, the blades being in folded position, Fig. 2 is a side elevation thereof with the blades in this position, Fig. 3 is a view similar to Fig. 1 showing the bevel blade swung to extend outwardly from the handle and in position for use, Fig. 4 is a vertical transverse sectional view showing the position of the square blade when swung outwardly for use, and, Fig. 5 is a vertical sectional view through the tool taken in a plane at right angles to the plane of Fig. 4.

As shown in the drawings the tool comprises a handle indicated by the numeral 7 and this handle is provided with a slot 8 and a slot 9. The slot 8 opens through both sides of the tool handle 7 and also through one end thereof whereas the slot 9 opens through the sides of the tool handle.

A pivot pin 10 is passed entirely through the handle adjacent that end through which the slot 8 opens and this pin also passes through a slot 11 formed in a bevel blade 12, the said blade being received for the greater portion of its length in the said slot 8 and being adapted to be swung from position in the said slot to extend at any desired angle with respect to the tool handle 7. A square blade 13 is pivoted by means of the pivot pin 10 in the slot 9 and has its pivoted end rounded as at 14 so that the blade may be swung to lie either within the slot 9 or to extend at right angles with respect to the tool handle. The end wall of the slot 9 is indicated by the numeral 15 and it is against this wall that one or the other of the longitudinal edges of the blade 13 abut when the blade is extended to a position exactly at right angles with respect to the tool handle, it being understood that the said blade and the handle coöperate to form a square.

In order that the blade heretofore described may be held in proper position, I have threaded the ends of the pivot pin 10 as indicated at 16 and have engaged upon the said ends thumb nuts 17 which may be turned to clamp the spaced portions of the handle formed by slotting the same against one or the other of the blades, it being understood that one or both blades may be tightened in this manner.

What is claimed, is—

A tool of the class described comprising a handle provided with a slot opening through the sides and one end thereof and with a slot which opens through the sides only, a bevel blade pivoted in the first mentioned slot, a square blade pivoted in the second mentioned slot and adapted to abut with one of its longitudinal edges that wall of the said slot which is adjacent the pivot for the blade whereby the blade will be positioned at right angles with respect to the handle, and means whereby the blades may be held together in adjusted position.

In testimony whereof, I affix my signature, in presence of two witnesses.

SIMON G. PETTERSON.

Witnesses:
HENRY MARX,
JO. NICHOL.